(12) United States Patent
Thomas

(10) Patent No.: US 6,932,378 B2
(45) Date of Patent: Aug. 23, 2005

(54) PASSENGER AIR BAG MODULE WITH COVER COUPLING MECHANISM

(75) Inventor: David E. Thomas, North Branch, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/881,512

(22) Filed: Jun. 30, 2004

(65) Prior Publication Data

US 2005/0046157 A1 Mar. 3, 2005

Related U.S. Application Data

(60) Provisional application No. 60/499,233, filed on Aug. 29, 2003.

(51) Int. Cl.$^7$ .............................................. B60R 21/20
(52) U.S. Cl. ................................................... 280/728.3
(58) Field of Search .......................... 280/728.3, 728.2, 280/732, 731

(56) References Cited

U.S. PATENT DOCUMENTS

| 5,217,253 | A | * | 6/1993 | Pray ........................ 280/728.3 |
| 5,297,813 | A | * | 3/1994 | Baba et al. ............... 280/728.3 |
| 5,876,058 | A | * | 3/1999 | Nemoto .................... 280/728.2 |
| 5,887,891 | A | * | 3/1999 | Taquchi et al. .......... 280/728.3 |

FOREIGN PATENT DOCUMENTS

JP   2000301996 A  * 10/2000  ........... B60R/21/20

* cited by examiner

Primary Examiner—Peter C. English
(74) Attorney, Agent, or Firm—Markell Seitzman

(57) ABSTRACT

Disclosed is a passenger module (10) with a cover coupling mechanism (12, 14, 28, 30). The cover coupling mechanism has a generally C-shaped bracket (12, 14), which interfaces with a plurality of slots (65, 66) defined in an air bag cover (20). The C-shaped bracket further has a plurality of apertures (22) which interface with a plurality of threaded studs (24) on the module's housing.

11 Claims, 7 Drawing Sheets

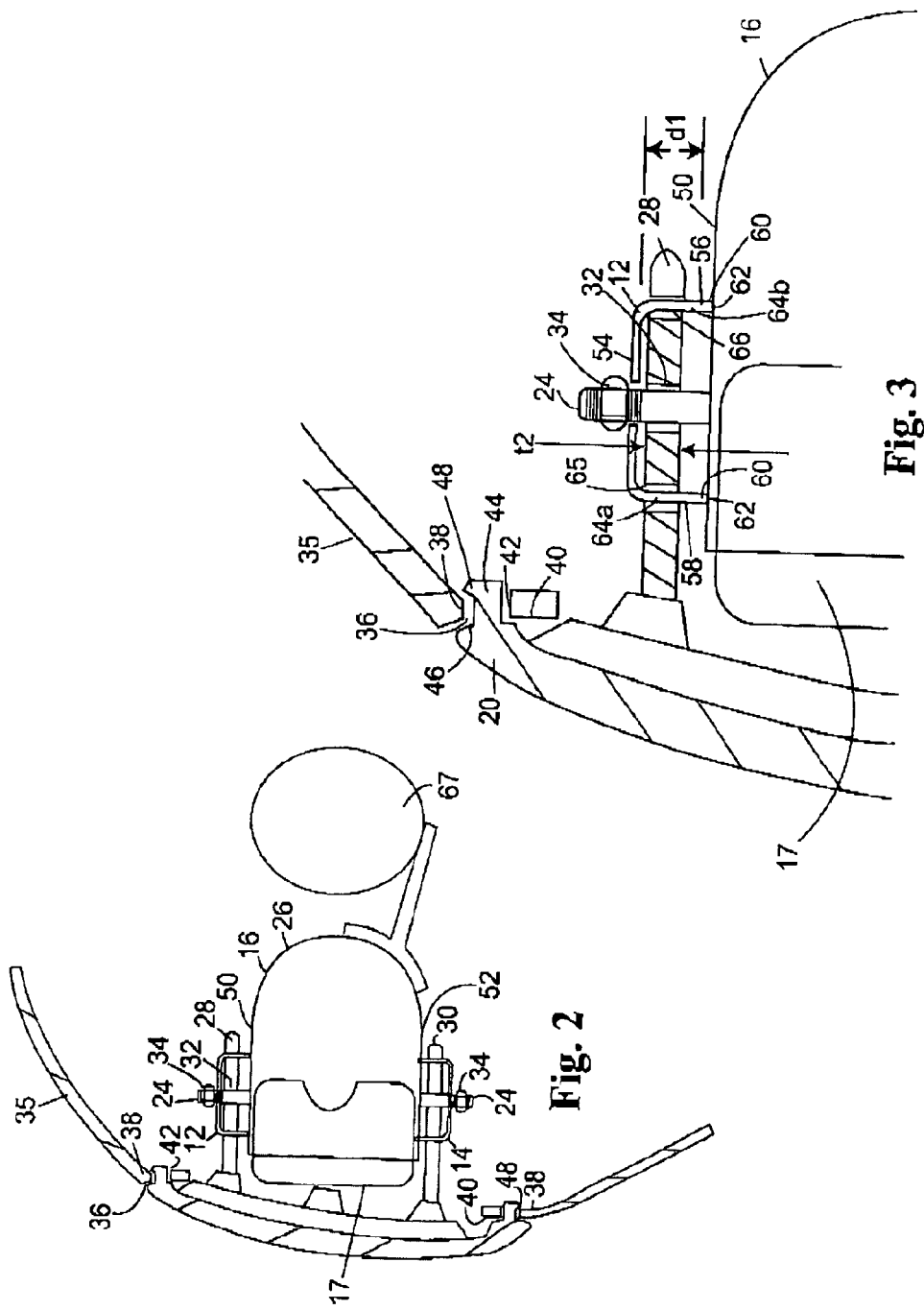

PASSENGER AIR BAG MODULE WITH COVER COUPLING MECHANISM

FIELD OF THE INVENTION

This application claims the benefit of U.S. Provisional Application 60/499,233, filed on Aug. 29, 2003. The disclosure of the above application is incorporated herein by reference.

The present invention generally relates to motor vehicle air bags. More particularly, the invention relates to a passenger air bag module having an air bag cover coupling mechanism which improves fit and finish characteristics of the air bag cover when the cover is coupled to a vehicle's instrument panel.

BACKGROUND OF THE INVENTION

Passenger air bag modules are typically mounted within the instrument panel or dashboard of the vehicle. A typical passenger air bag module includes a housing, which facilitates the mounting of the passenger air bag module to the vehicle and provides a reaction surface for deployment forces, a single or dual stage inflator mounted to the housing, an air bag, and a cover. The prior art teaches a wide variety of methods to couple the air bag module to the instrument panel or dashboard. Typically, the backside of a passenger air bag module is coupled to a vehicle's cross-car beam using a depending flange. While cross-car beam provides a very stable platform for absorbing reaction forces of the deploying air bag, its relative location within a vehicle often changes due to standard manufacturing tolerances. As such, the use of a vehicle's cross-car beam as a positional reference point often leads to poor fit and finish characteristics of the air bag cover with respect to the instrument panel.

Other systems have attempted to alleviate this problem by incorporating an air bag cover directly into an instrument panel. Unfortunately, after a deployment of the air bag, such systems require the replacement of the entire instrument panel or support surface. This significantly increases the cost and complexity of repairing the vehicle after an air bag deployment event.

SUMMARY OF THE INVENTION

As such, it is an object of the present invention to overcome the disadvantages of the prior art. Disclosed is a passenger air bag module having a housing, an inflator, and an air bag. Coupled to the housing is a cover, which has a plurality of coupling members, which interface with a plurality of apertures defined within the instrument panel. The cover is coupled to the housing using a bracket having a generally C-shaped cross-section. The C-shaped bracket is coupled to a plurality of retaining flanges, which are disposed on the housing. Further, the C-shaped bracket has a plurality of cover flange engaging members, which are disposed through a plurality of slots defined in the cover to interface with an exterior surface of the housing and which provide for relative movement of the cover and housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 represents a cross-sectional side view of the module of FIG. 1 disposed within an instrument panel;

FIG. 3 represents an expanded view of a cover coupling mechanism shown in FIG. 2;

DETAILED DESCRIPTION OF THE PREFERRED EMBODIMENT

The following description of the preferred embodiment is merely exemplary in nature and is in no way intended to limit the invention, its application, or uses.

Figure 1:
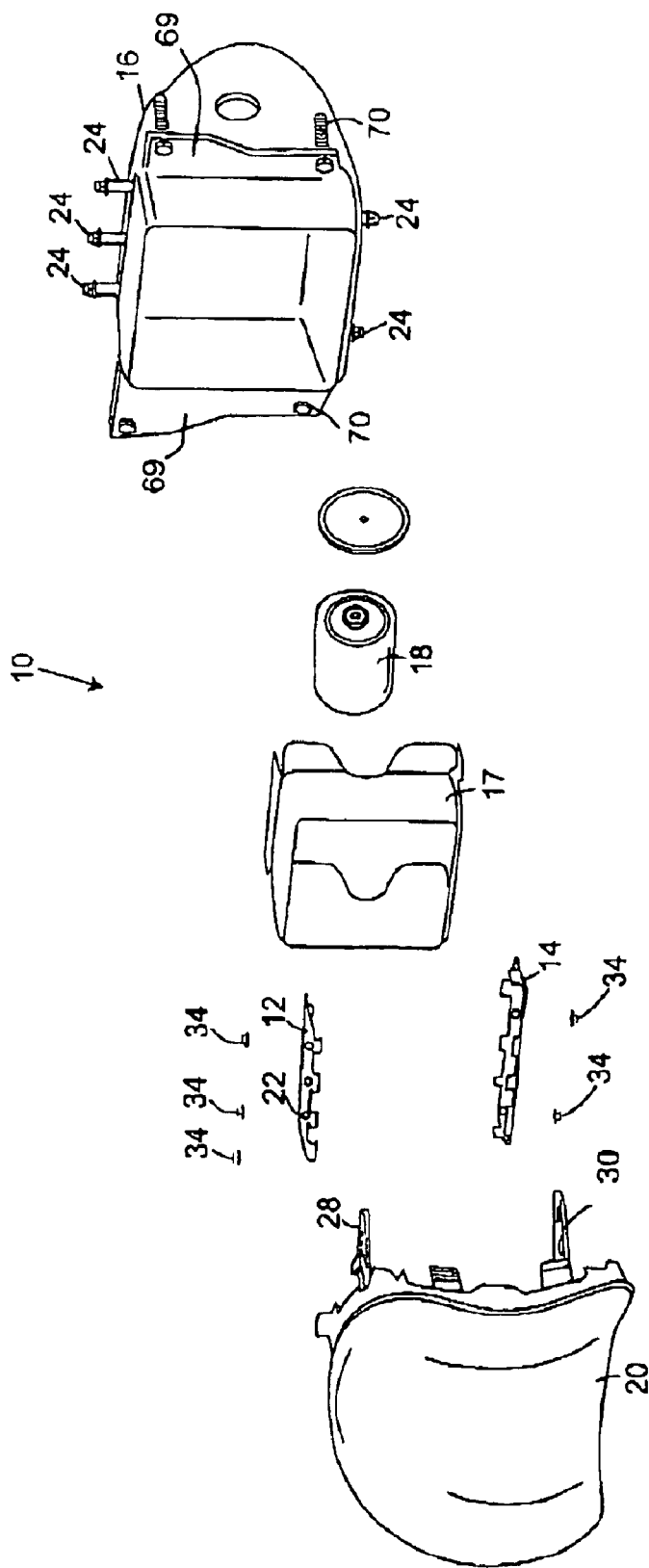
FIG. 1 represents an exploded perspective view of an air bag module according to the teachings of the present invention.

FIG. 1 represents an exploded perspective view of the module 10 utilizing fixation brackets 12 and 14 according to the teachings of the present invention. The module 10 includes a housing 16, a chute 17, a cushion pack comprising the air bag (not shown), an inflator 18, and a cover or door 20. The inflator 18 has first and optional second energy sources of known type to provide inflation gases to the cushion pack in a staged or sequenced manner to inflate the cushion. The cover 20 is slidably attached to the housing 16 using the fixation brackets 12 and 14.

In this regard, the first fixation bracket 12 has a plurality of apertures 22, which mate with a corresponding plurality of studs 24 extending from an exterior surface 26 of the housing 16. Similarly, the cover 20 has a pair of depending flanges 28 and 30. Each flange 28 and 30 defines a plurality of corresponding apertures 32 (see FIG. 5) which aligns with a corresponding aperture 22 of one of the fixation brackets 12 and 14. Each stud 24 of the housing 16 extends through a corresponding aperture 32. The brackets 12 and 14 are coupled to the studs 24 using a plurality of threaded fasteners 34. While the studs 24 are shown extending from the sides of the housing 16, the studs can be inserted through brackets 12 or 14 and flanges 28 or 30 and received within thread openings in the sides of the housing.

FIG. 2 represents a cross-sectional side view of the module 10 disposed within an instrument panel 35. The instrument panel 35 defines a first aperture 36, which defines a periphery 38 thereabout. Disposed adjacent to the periphery is at least one retaining surface 40, which defines a plurality of retaining apertures 42. The retaining apertures 42 function to accept a plurality of retaining tabs or flanges or hooks 44, which are positioned about the periphery 46 of the cover 20. The periphery 46 (noted in FIG. 3) of the cover 20 generally corresponds to the periphery 38 of the first aperture 36 in the instrument panel 35. Each retaining flange 44 of the cover 20 has a corresponding mating tooth or enlarged end 48, which optionally functions to releasably lock the retaining flange 44 into the retaining aperture 42 of the instrument panel 35. In the preferred embodiment each retaining flange 44 is flexibly connected to the cover and is an integral part therewith.

The depending flanges 28 and 30 are generally parallel to one another and will align to a corresponding a pair of generally parallel surfaces 50 and 52 on the exterior surface 26 of the housing 16.

As best seen in FIG. 3, the fixation brackets 12 and 14 are generally C-shaped (or U-shaped) having a base 54 and depending sides or side flanges 56 and 58. The proximal end 60 of the depending side flanges 56 and 58 forms a coupling or engagement surface 62, which generally engages a surface 50 of the exterior surface of the module. Each bracket 12 and 14 may also include depending end flanges such as 57 and 59. The end flanges 57 and 59 provide each bracket 12 and 14 with greater rigidity, preventing the bracket from being bent inwardly when fastener 34 is tightened.

In the preferred embodiment the depending side flanges 56 and 58 of fixation bracket 12 and 14 are segmented so as to form a plurality of cover flange engagement members 64a and 64b. The cover flange engagement members 64b of the first flange 56 are positioned so that they are not aligned with the cover engagement members 64a of the second depending side flange 58. Further, the engagement members of each depending flange 56 and 58 are disposed to be able to extend through a corresponding slot 65 and 86 defined within the cover depending flanges 28 and 30.

Figure 5:
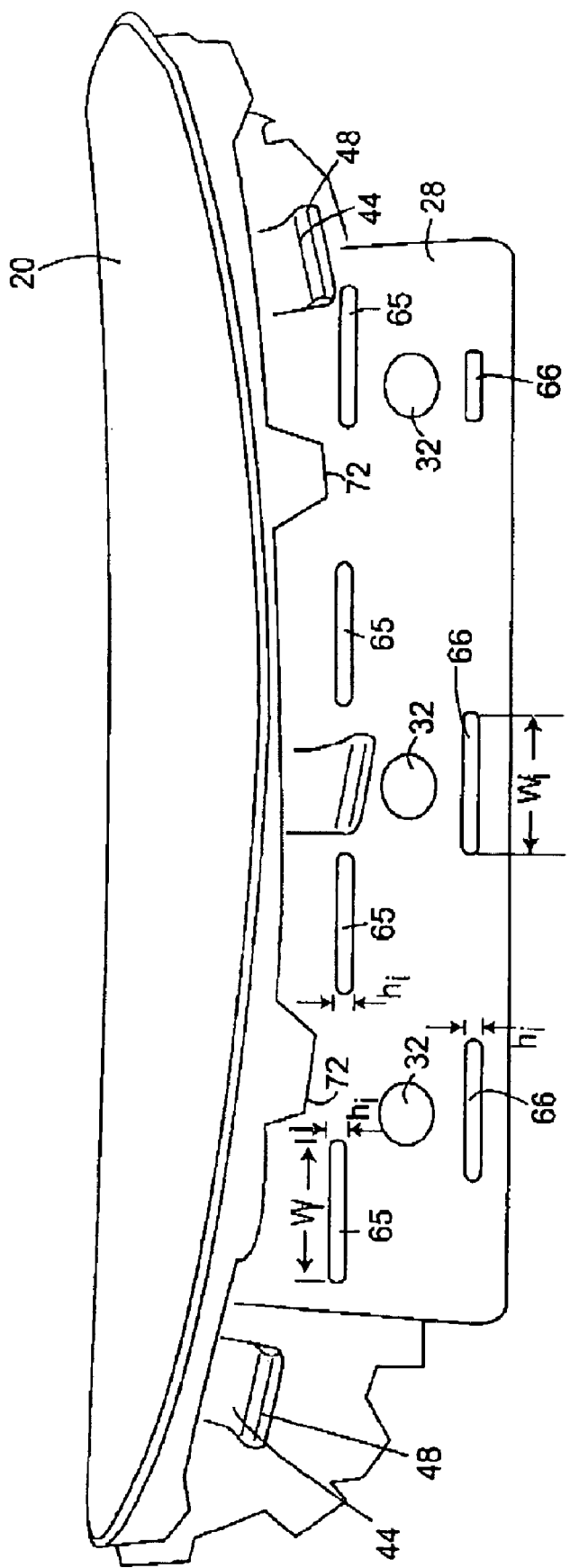
FIG. 5 represents a top view of the cover shown in FIG. 1.
Figure 6:
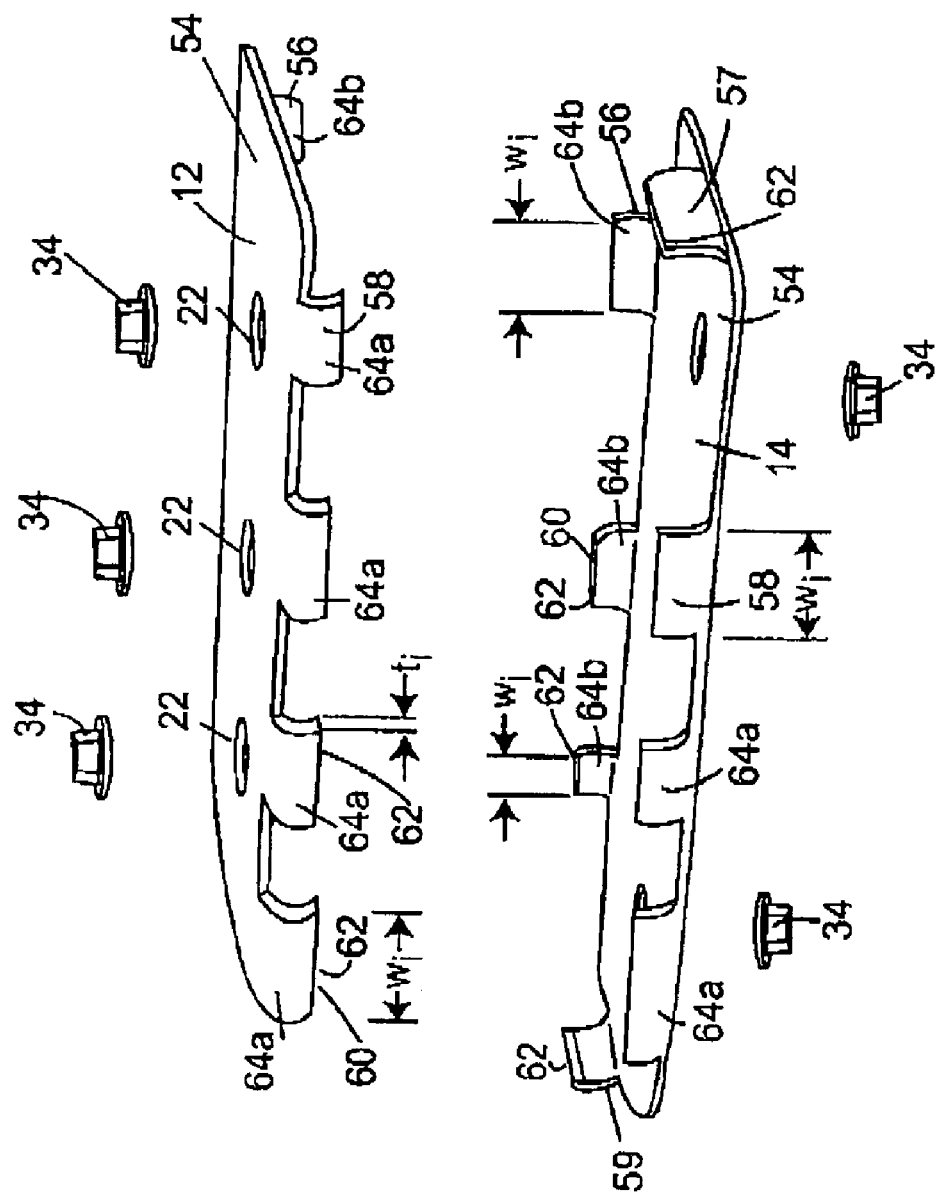
FIG. 6 represents a perspective view of a first and second retaining bracket shown in FIG. 1.

As best seen in FIGS. 3, 5 and 6, the thickness, $t_f$, of each engagement member 64a and 64b is smaller than the height, $h_f$, of a corresponding slot 85 and 66 (into which the engagement member is received) thereby permitting the relative vertical up-and-down motion of the housing 16 relative to the cover 20. The thickness of each engagement member can be the same or can differ; similarly the height of each groove can be the same or can differ. The width $w_f$, of each engagement member is narrower than the width, $W_f$, of a corresponding groove 65 or 66, allowing for the side-to-side (or left-to-right) relative movement of the housing and the cover. The depth, d1, of the depending side flanges 56 and 58 of the fixation flanges 12 and 14 is deeper than the thickness, t2, of the flanges 28 and 30. This allows relative front-to-back motion of the housing 16 with respect to the cover 20 and to the cross-car beam 67. Further, the slots 65 and 66 of each bracket 12 and 14, as well as the apertures 32 of the cover flanges, are oversized relative to each fastener 24 to also allow horizontal and vertical movement of the housing 16 with respect to the cover 20, with the cover fixed on the instrument panel or in a preferred location thereon.

Hence, the construction of the module 10 of the present invention allows the air bag cover 20 to mate with the instrument panel 35 while permitting the module's housing 16 to float with respect to the cover 20. In this way, with the cover in alignment with the instrument panel, the housing 16 can be moved along three perpendicular axes relative to the cover 20 and to the vehicle fixation points such as the vehicle's cross-car beam 67, and then secured to the fixation points.

Figure 4:
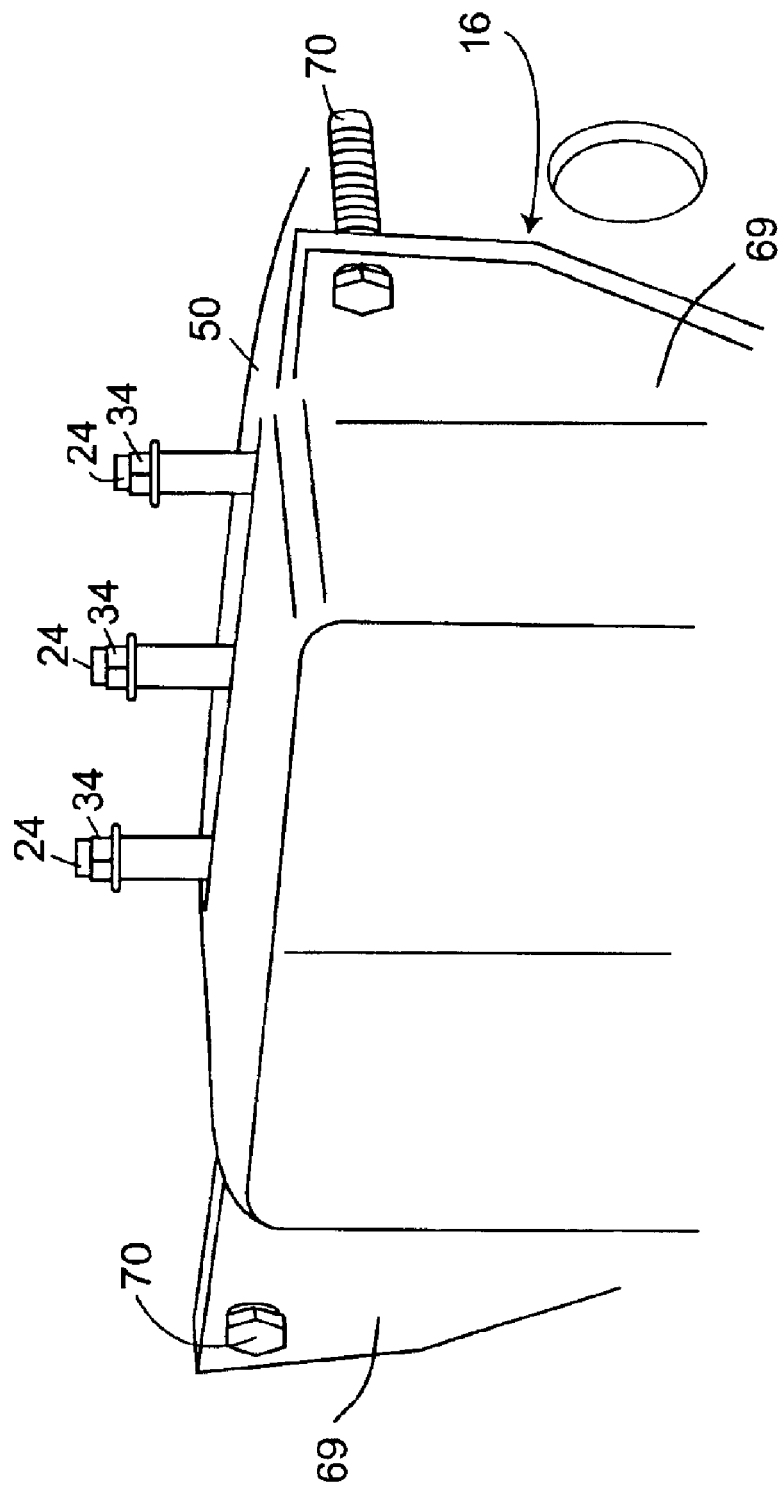
FIG. 4 represents a sectional perspective view of the housing shown in FIG. 1.

FIG. 4 represents the housing shown in FIG. 1. It is envisioned that the housing may be formed of cast or stamped metals or, alternatively, by reinforced composites. Coupled to the housing is the plurality of fixation flanges 69. These flanges are optionally threaded studs 24 used to couple the cover 20 to the housing 16. Further shown is a pair of threaded fasteners 70, which are used to mount the housing 16 to an interior surface of the instrument panel 35.

FIG. 5 represents a top view of the cover 20. The depending flange 28 has a plurality of apertures 32, which mate with the studs 24 of the housing 16. As mentioned, the diameter of each aperture 32 is significantly larger than the diameter of a corresponding stud 24. Further shown is the configuration of the slots 65 and 66 of the depending flange 28. As shown, the rows of slots 65 and 66 are staggered as to correspond to the cover flange engagement members 64a and 64b of the fixation brackets 12 and 14. Disposed about the periphery 46 of the cover 20 are the cover retaining flanges 44, which snap to the instrument panel about opening 36. Also shown is a plurality of stop flanges 72, which prevent the cover 20 from being pushed into the instrument panel 35.

FIG. 6 represents a perspective view of the fixation brackets 12 and 14. Shown is the base member 54 and depending side flanges 56 and 58. As mentioned previously, the depending side flanges 56 and 58 are segmented so as to form sets of cover flange engagement members 64a and 64b. It is envisioned that these cover flange engagement members 64a and 64b can either extend from the base member 54 in a straight or curved manner (as is shown).

Figure 7:
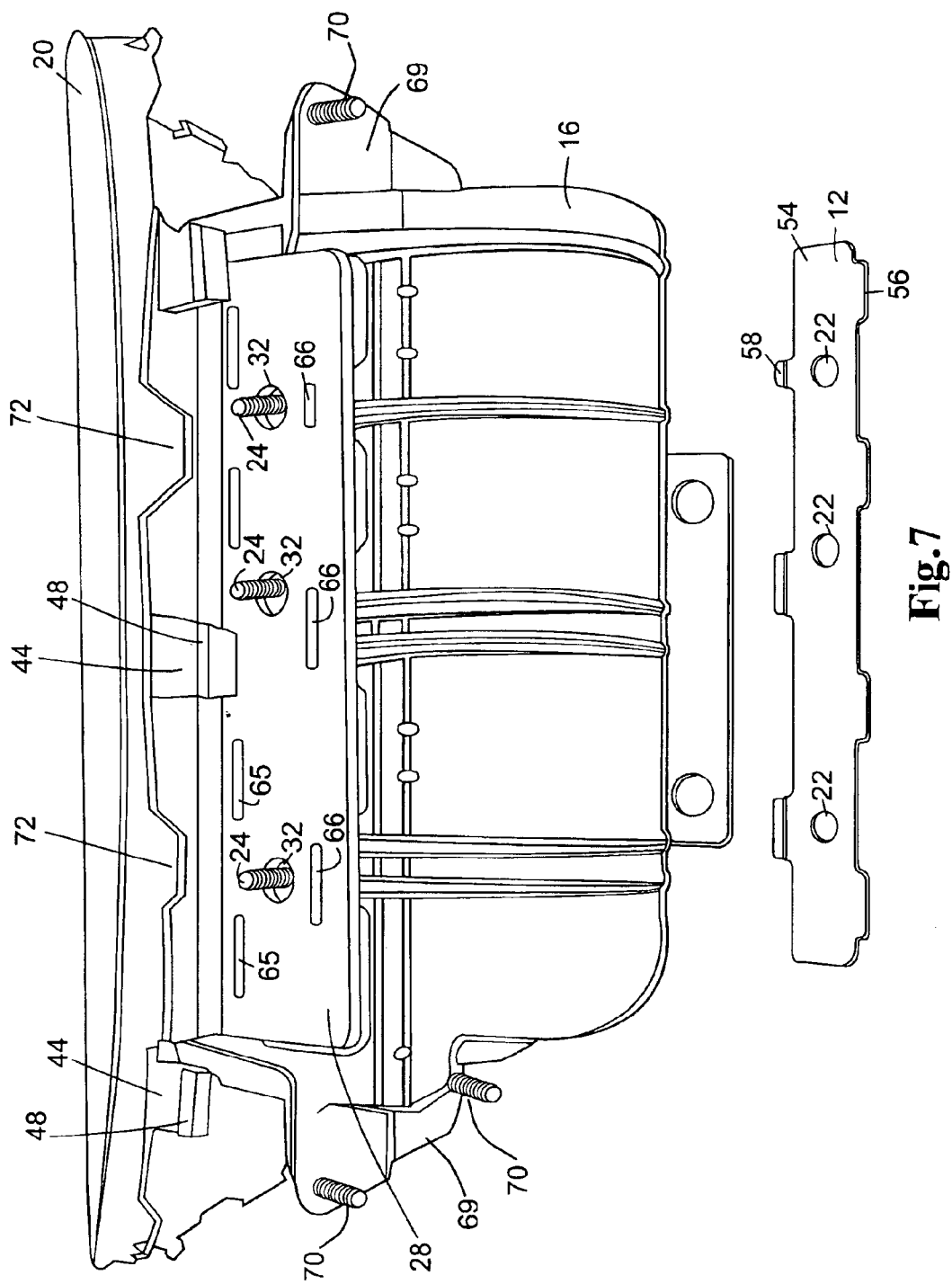
FIGS. 7 and 8 represent views of the module shown in FIG. 1 during its manufacture.
Figure 8:
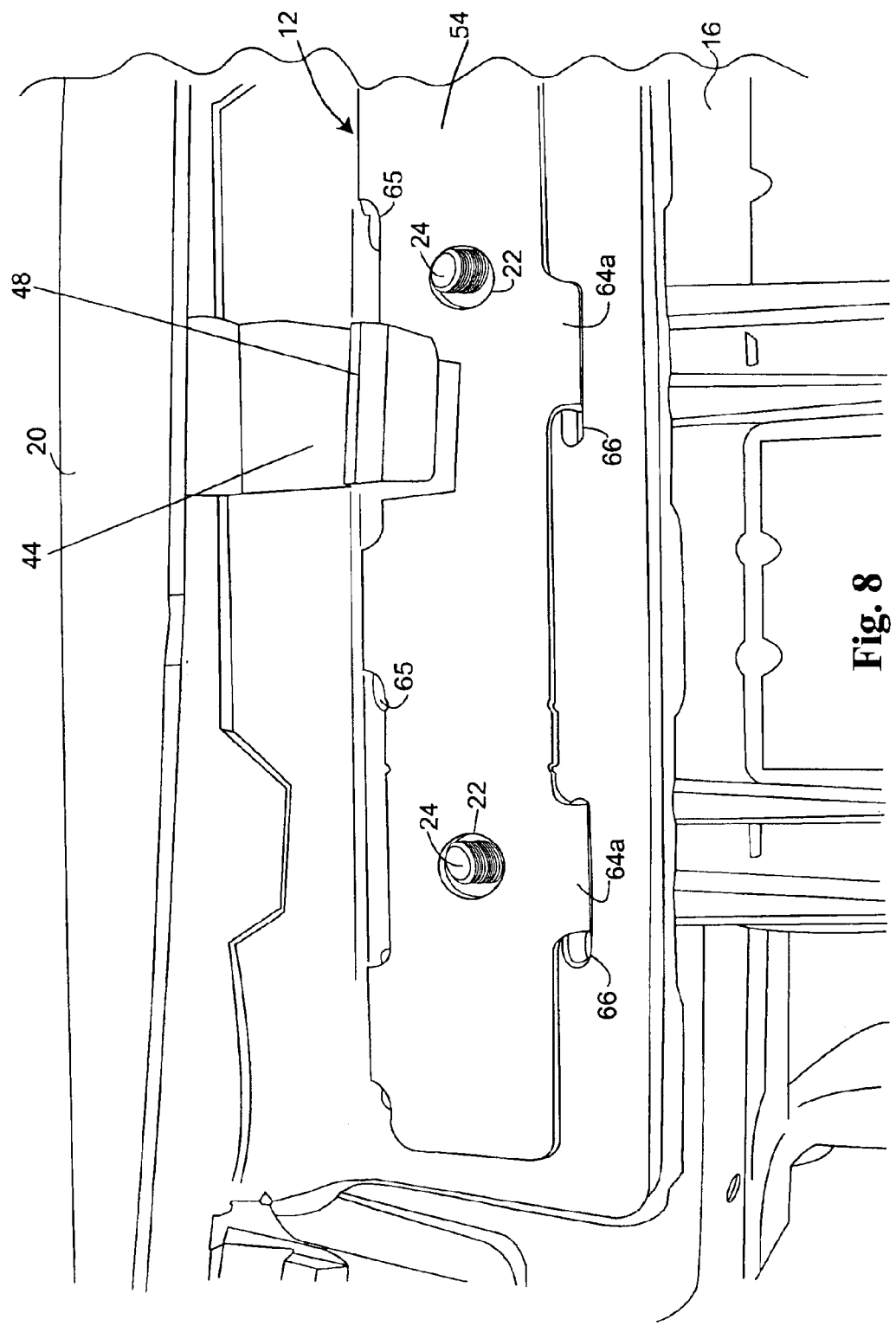

With general reference to FIGS. 7 and 8, steps in the manufacturing of the module 10 according to the teachings of the present invention are shown. Prior to coupling the cover 20 to the housing 16, the cushion pack and inflator are disposed and fixed to or placed within the housing 16. The depending flanges 28 and 30 are rotated away from each other so as to allow the apertures 32 of the depending flanges 28 and 30 to be positioned over the studs 24 of the housing 16. As can be seen in FIG. 8, the fixation bracket 12 is subsequently placed over the cover 20 and depending flange 28 so as to allow the apertures 22 of the fixation bracket 12 to be positioned over the studs 24 and the engagement members 64a, 64b through grooves 65 and 66.

As mentioned, the length of the slots 65 and 66 of cover 20 depending flange 28 is longer than the length of corresponding flange engagement members 64a and 64b. Further, the aperture 22 defined in fixation bracket 12 has a diameter significantly larger than the diameter of the stud 24 and sufficient not to block the relative movement between the cover and brackets 12, 14. The combination of the extended slots 65 and 66 in the cover flange 28, as well as the size of the aperture 22 and apertures 32 formed in the cover flange 28 and bracket 12, allows for the relative transverse movement of the housing 16 with respect to the cover 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air bag module (10) comprising:
    a housing (16) having a plurality of door retaining features (24);
    a door (20) having a pair of depending door flanges (28, 30), at least one of the door flanges defining a first set of apertures configured to be disposed over a corresponding set of door retaining features (24), said depending flanges further defining a first set of slots;
    a retaining bracket, generally C-shaped or U-shaped in cross-section, having a plurality of door retention members (64a, 64b) and a plurality of apertures (22) configured to be disposed over the housing door retaining features (24); wherein the apertures in the bracket are configured to be disposed over the door retaining features when the door retention members are through the slots.

2. The air bag module (10) according to claim 1 wherein the door retaining features are threaded studs.

3. The air bag module (10) according claim 1 wherein the depending door flanges each define a pair of rows of slots (66, 65).

4. The air bag module (10) according to claim 3 wherein adjacent slots in each of the pairs of slots are offset with respect to each other.

5. The air bag module (10) according to claim 1 wherein the retaining bracket comprises a row of door retention members.

6. The air bag module (10) according to claim 5 wherein the retaining bracket comprises a second row of door retention members and wherein the rows of door retention members (64a, 64b) are offset.

7. The air bag module (10) according to claim 1 wherein the door retention members (64a, 64b) define a coupling surface (62) which interfaces with the housing (16).

8. The air bag module (10) according to claim 1 wherein the slots (65, 66) and the first set of apertures (32) have a size which allows relative movement of the door with respect to the housing.

9. The air bag module (10) according to claim 1 wherein the retaining bracket has a pair of legs having a length longer than a corresponding thickness of the depending door flanges.

10. An air bag module (10) comprising:

a housing (16) having opposing sides (50, 52);

a deployment door (20) openable upon inflation of an air bag located within the housing, the door including a pair of depending door flanges (28, 30), at least one of the door flanges defining a first set of apertures (32) configured to be disposed over the housing sides and adapted to receive corresponding fasteners (24), each of said depending flanges further including a first set of slots including a first and second row of slots (65, 66);

a retaining bracket having a main body (54) and a plurality of door retention members extending therefrom, at least one opening (22) in the main body (54), each at least one opening (22) configured to also receive one fastener, each door retention member loosely disposed within a corresponding slot of one of the depending flanges enabling relative movement of each door retention member with its corresponding slot.

11. The module as defined in claim 10 wherein the door retention members are configured, when in contact with respective side (50, 52) of the housing, to space the main body of the retaining bracket away from the respective side of the housing enabling the corresponding door flange to be loosely secured between the respective housing side and an underside of the main body.

* * * * *